April 21, 1970 K. GÖBEL 3,507,470
SUPPORT BRACKET FOR SEALING MEMBERS
Filed Feb. 28, 1968 4 Sheets-Sheet 2

Inventor:
KLAUS GÖBEL
BY
Robert W. Beach
ATTORNEY

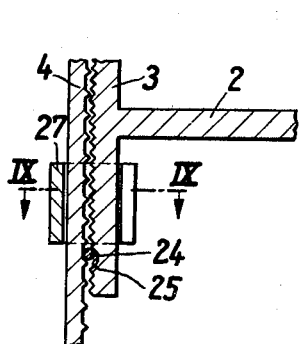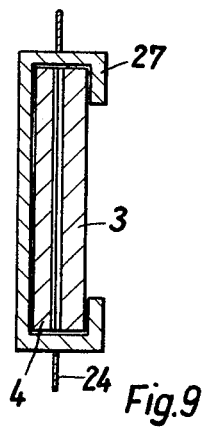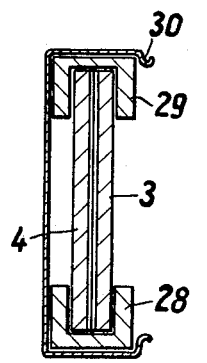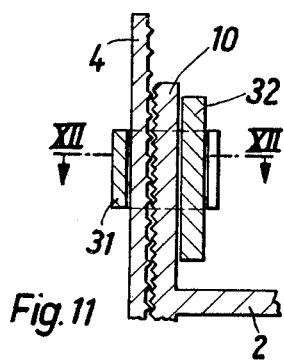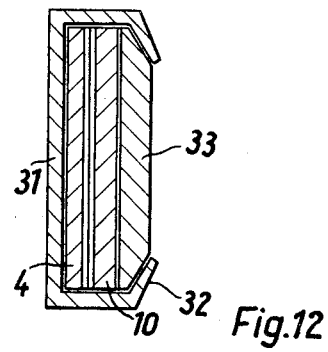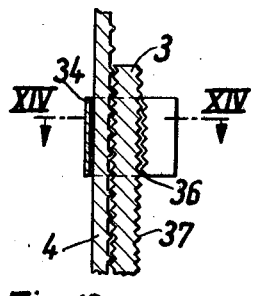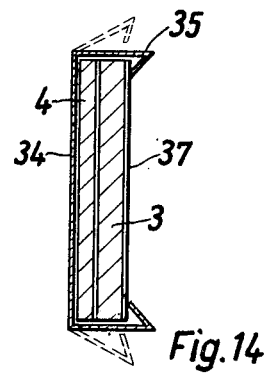

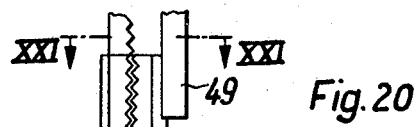
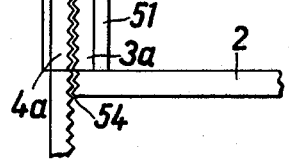
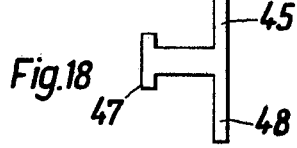
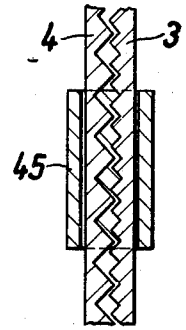
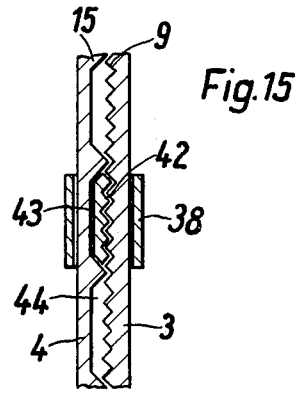
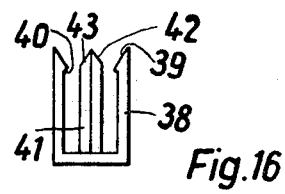
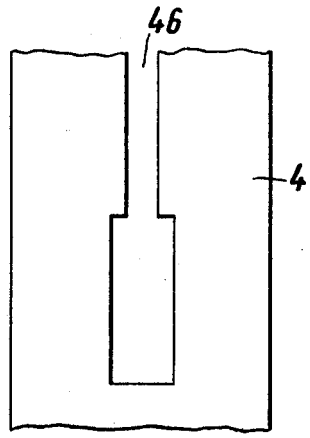

United States Patent Office 3,507,470
Patented Apr. 21, 1970

3,507,470
SUPPORT BRACKET FOR SEALING MEMBERS
Klaus Göbel, Zeughausstr. 41,
Trier, Germany
Filed Feb. 28, 1968, Ser. No. 709,042
Claims priority, application Germany, Mar. 3, 1967,
1,609,977
Int. Cl. E04f 19/02
U.S. Cl. 248—205
12 Claims

ABSTRACT OF THE DISCLOSURE

The invention provides, for use in the fixing of sealing strips, fascia boards and the like at the eaves, or at the gable, or at the junction between ceiling and roof bearers of a building structure, a holding device comprising a holding angle providing a horizontal leg for fixing to the building structure and a vertical leg having toothing on its outer face, a holding part lying against the vertical leg and having respective toothing interengaging with the toothing of such vertical leg, and clamping means pressing the holding angle and holding part into interengagement, whereby vertical adjustment of the holding part relative to the holding angle is achieved.

---

The invention relates to a mounting device more especially for the attachment of sealing members in the facings of buildings, for example for attaching a sealing strip or fascia board at the eaves of a house.

Various embodiments of mounting device are known for the attachment of a sealing strip or sealing fascia at the gable end, at the eaves, or at the junction between ceiling and roof bearers, in building structures. For instance there are mounting devices which consists of a holding angle the horizontal leg of which can be fastened to the roof structure or to the structure of the building, whilst the vertical leg thereof laterally overlaps the roof for the sealing strip or sealing fascia board to be mounted thereon. Also known are mounting devices in which the sealing strip can be engaged with a special holding part which can be fastened through screws or the like so as to be vertically adjustable on the holding angle. So as to prevent any slipping of the holding part in relation to the holding angle, in the case of the known mounting device, the outer surface of the vertical leg of the holding angle and the abutting surface of the holding part can each be formed with complementary toothing which guarantees a firm interengagement.

In the case of the known mounting devices of this type it has, however, proved to be disadvantageous that the two mounting device parts have to be perforated, to enable them to be held together at the desired relative levels with the aid of an assembly screw. This involves a weakening of the individual parts on the one hand, and leads to a complicated and thereby costly production on the other hand.

The mounting device of the invention is distinguished from the prior proposals in that the two holding parts are adapted to be pressed one against the other.

Advantageously two complementally-toothed holding parts are pressed against each other by a clamping element which embraces the two parts and is lockable relative thereto. The clamping element may be designed as a closed or open clamping band as a channel-shaped clamping strap, or as a T-shaped key. The clamping element is preferably held against slipping by a key, pin, spring or the like. It is, however, also conceivable to connect the clamping element integrally to the mounting device holding parts which are to be clamped to one another, so that no separate clamping elements are necessary.

The invention will be described further, by way of example, with reference to the accompanying drawings, in which.

Figure 4:
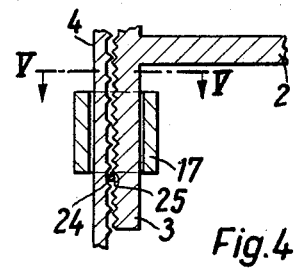
FIG. 4 is a fragmentary cross-sectional side elevation of a third embodiment of the mounting device of the invention.
Figure 3:
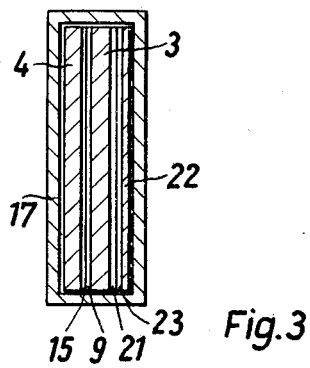
FIG. 3 is a cross-sectional plan view taken on the line III—III of FIG. 2.
Figure 5:
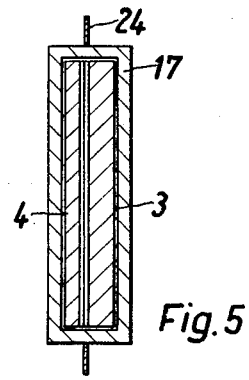
Figure 6:
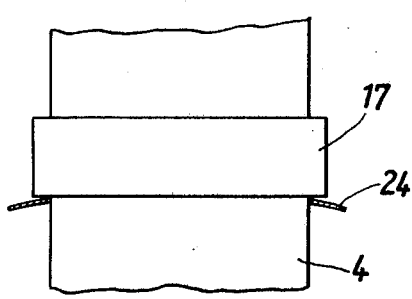
Figure 7:
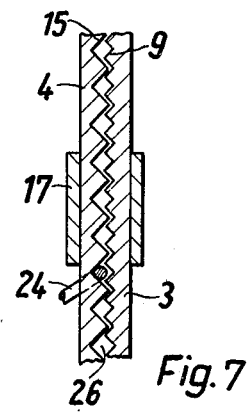

FIG. is a cross-sectional plan view taken ton the line V—V of FIG. 4;

FIG. 6 is a fragmentary front elevation of the embodiment of FIGS. 4 and 5;

FIG. 7 is a fragmentary cross-sectional side elevation of a fourth embodiment of the mounting device of the invention;

FIG. 8 is a fragmentary cross-sectional side elevation of a fifth embodiment of the mounting device of the invention;

FIG. 9 is a cross-sectional plan view taken on the line IX—IX of FIG. 8;

FIG. 10 is a view similar to FIGS. 3, 5 and 9, but showing a sixth embodiment of the mounting device of the invention;

FIG. 11 is a fragmentary cross-sectional side elevation of a seventh embodiment of the mounting device of the invention;

FIG. 12 is a cross-sectional plan view taken on the line XII—XII of FIG. 11;

FIG. 13 is a fragmentary cross-sectional side elevation of an eighth embodiment of the mounting device of the invention;

FIG. 14 is a cross-sectional plan view taken on the line XIV—XIV of FIG. 13;

FIG. 15 is a fragmentary cross-sectional side elevation of a ninth embodiment of the mounting device of the invention;

FIG. 16 is a plan view of the clamping piece of the embodiment of FIG. 15;

FIG. 17 is a fragmentary cross-sectional side elevation of a tenth embodiment of the mounting device of the invention;

FIG. 18 is a plan view of the clamping piece of the embodiment of FIG. 17;

FIG. 19 is a fragmentary front view of the holding part of the embodiment of FIGS. 17 and 18;

FIG. 20 is a fragmentary cross-sectional side elevation of an eleventh embodiment of the mounting device of the invention; and FIG. 21 is a sectional plan taken along the line XXI—XXI of FIG. 20.

Throughout the various figures similar reference numerals have been allocated to similar or comparable parts.

In all the illustrated cases, the mounting device serves for the atachment of a sealing profile or a fascia board (for example at a roof gable, at the eaves of a building or at the junction between roof and ceiling bearers) and consists of a holding angle 1 having a horizontal leg 2 and a vertical leg 3 as well as of a holding part 4 which is separate from the holding angle.

The horizontal leg 2 of the holding angle 1 has one or more holes 5, which enable the holding angle to be attached by means of screws 6, nails or the like to appropriate structure 7 at the eaves, gable of other junction between the vertical structure and the roof of a building. In the case illustrated in FIG. 1, the structure 7 is constituted by a ceiling bearer of the building.

The vertical leg 3 of the holding angle 1 has toothing 9 on its outer face 8, i.e. the face remote from the horizontal leg 2. Upwardly extending part 10 of the vertical leg 3 advantageously tapers upwardly, and the leg 3 is downwardly extended beyond the horizontal leg 2 to provide a downwardly pointing leg part 11 which is noticeable shorter than the upwardly projecting part 10. The holding angle 1 can be fixed as shown in FIG. 1 or alternatively it can be fixed upside down relative to its position shown in FIG. 1, that is to say with the short leg part 11 upwards and the long leg part 10 downwards.

The holding part 4 projects past the respective ends of the vertical leg 3 of the holding angle 1, both in the upward and downward directions, and has, on its ends, holding extension pieces 12 and 13, onto which a sealing profile or fascia board 14, desired to be held by the mounting device, can be clamped or engaged. On its surface butting against the vertical leg 3 of the holding angle 1, the holding part 4 also has toothing 15, in which the pitch of the tooth tips is, for example a multiple of the pitch of the toothing 9 on the vertical leg 3 of the holding angle 1. Also, the tooth edges of the toothings 9 and 15 may, if desired, be ararnged at an angle to each other.

Figure 1:
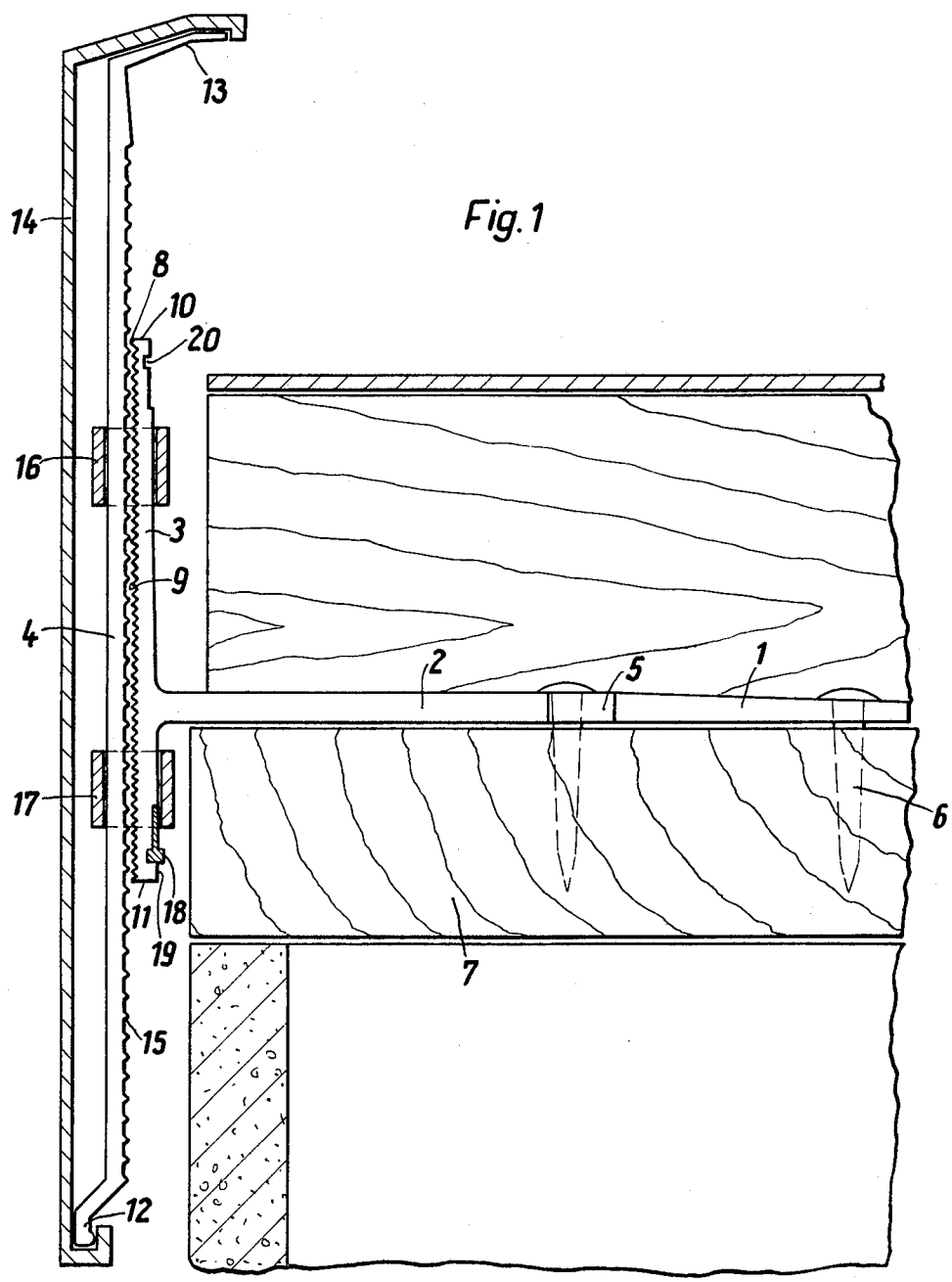
FIG. 1 is a cross-sectional side elevation illustrating a first embodiment of the mounting device of the invention in position at the junction between the roof bearers and the ceiling bearers of a building structure or on a gable of such a structure.

In all of the embodiments of FIGS. 1 to 6, the vertical leg 3 of the holding angle 1 and the holding part 4 and clamped one against the other by upper and lower spaced clamping elements 16 and 17, which are designed as endless bands and embrace both parts in such a way that the toothings 9 and 15 interengage and a rigid location of the two parts one relative to the other is achieved. As shown in FIG. 1 advantageously respective ones of the clamping bands are provided on the upper leg piece 10 and on the lower leg piece 11.

In the embodiment of FIG. 1, the upper clamping ring 16 is slipped down from above towards the horizontal leg 2 of the holding angle 1 until it jams as a result of the tapering form of the leg port 10 and clamps the holding part 4 firmly against the upper leg part 10. The clamping band 17 situated underneath the horizontal leg 2 is retained by means of a key 18. This key 18 engages in a corresponding recess 19 of the vertical leg 3 and prevents dropping down of the clamping band. An upper recess 20 is provided in the upwardly extending part 10 of the vertical leg 3 for use in the case where the holding angle is fixed upside down, with the long leg piece 10 projecting downwards.

Figure 2:
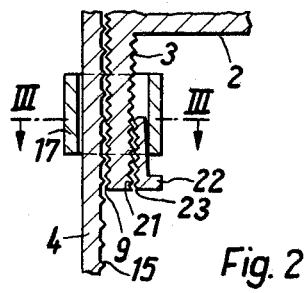
FIG. 2 is a fragmentary cross-sectional side elevation of a second embodiment of the mounting device of the invention.

FIGS. 2 and 3 show an embodiment of the mounting device wherein not only is the outer surface 8 of the vertical leg 3 provided with toothing 9, but wherein the inner face of such leg 3 has a toothing 21. In this case the clamping band 17 is also retained by a key 22 which tapers and is formed with toothing 23 corresponding to the toothing 21. The key 22 ensures, in a manner similar to the key 18 of FIG. 1, that the holding angle 1 and the holding part 4 are gripped together without play.

In the examples of FIGS. 4 to 7, the endless clamping band 17 is prevented from dropping down by means of a wire 24, profile pin or the like, inserted between leg 3 and holding part 4 transversely of their lengths, instead of a key. For this purpose there may be provided, either in the toothing 9 of the vertical leg 3 of the holding angle 1 or in the toothing 15 of the holding part 4, a recess 25 in which the wire 24 is insertable. FIG. 4 shows such recess 25 in the toothing 9 of the holding part 4. In the case of FIG. 7, the toothings 9 and 15 are of different sizes so that suitable gaps 26 occur between the teeth for insertion of the pin 24.

The emodiment of FIGS. 8 and 9 differs from the embodiment of FIGS. 4 to 6 only in that the clamping element thereof is designed not as an endless band 17 but as a channel-shaped band 27. Naturally in this embodiment, the recess 25 can be omitted if the toothings 9 and 15 are different from one another to provide gaps for the wire 24 as already described with reference to FIG. 7.

In the embodiments of FIGS. 4 and 8 in which a recess 25 is provided in the toothing 9 of the vertical leg, every second tooth of the toothing 15 in the holding part 4 is omitted, whereby location of the parts 1 and 4 at any desired level relative to one another is made possible. Naturally, the tooth pitch of the holding part 4 can be greater than the illustrated cases and may amount to a multiple of the tooth pitch of the toothing 9 on holding angle 1 which has a complete row of teeth. The tooth arrangements of the holding part and the holding angle 1 can, if desired, be reversed i.e. the holding part 4 has a recess 25 and the complete row of teeth, whilst the holding angle 1 has smaller or larger tooth pitch which in each case can be uniform or non-uniform.

The same important possibility of being able to locate the holding part 4 at any desired level arises from the employment of different sized teeth in the toothing 15 of the holding part 4 on the one hand and of the toothing 9 of the holding angle 1 on the other hand as in the embodiment of FIG. 7. With such differently sized tooth construction numerous gaps 26 of smaller or larger size arise which, in turn, can all be the same size or different in size.

In the embodiment of FIG. 10, the clamping elements are in the form of two channel-shaped stirrups 28 and 29 which can be slipped laterally onto opposite edges of the vertical leg 3 and the holding part 4, these stirrups 28, 29 being held by a channel-shaped clamping spring band 30.

In embodiment of FIGS. 11 and 12, which illustrate an attachment of the holding part 4 to the upper leg part 10, a firm gripping fit is obtained with an open clamping ring 31 the ends 32 of which are obliquely bent by use of a wedge 33 which presses the two parts 4 and 10 firmly one against the other. The outer face of the wedge 33 is bevelled along its upright edges complementarily to the oblique ends of the clamping ring 31.

In the embodiments of FIGS. 13 and 14, the clamping together of the parts is achieved by a U-shaped clamping strap 34 the ends 35 of which are adapted to be bent over, as is indicated by the broken lines in FIG. 14, and the edges 36 of which have respective toothings, which engage into corresponding toothing 37 on the inside face of the vertical leg 3 as shown in FIGURE 13.

A further embodiment is shown in FIGS. 15 and 16, in which a clamping piece 38, which can be pushed in from the side, serves to secure the holding part 4 relative to the holding angle 3. This clamping piece 38 channel or U-piece, the flange edges 39 of which taper and each has a barb 40, which barbs catch behind the lateral edges of the respective parts of the mounting device and grip such parts. Located between the flanges of the channel is a central tongue 41, the one side 42 of which is provided with teeth, which interengage with the teeth of the toothing 9 of the leg 3. The other side 43 of the central part is smooth and fits into an appropriate one of the recesses 44 between two adjacent teeth of the toothing 15 of the holding part 4.

In the embodiment of FIGS. 17 to 19, a T-shaped key 45 serves as the clamping element. The stem of this key is inserted through a width portion of a slotted aperture 46 provided in the vertical leg 3 and in the holding part 4 and is then shifted along the leg into the narrow portion of aperture 46 so that the shorter arms 47 on the foot of the stem and the longer arms 48 on the head of the stem clamp the holding part 4 and the vertical leg of the holding angle one against the other.

In the embodiment of FIGS. 20 and 21, the vertical leg 3a and the holding part 4a are pressed togethed in such a way that they firmly interengage without the provision of any separate clamping element. To this end, the holding part 4a is formed with an integral hook-shaped offset clamping strip 50 which is provided on its free end with a barb 49. The vertical leg 3a is formed with a recpective shoulder 51 complementary to the latch piece 49, as well as a bent-over clamping strip 52. Toothings 53 and 54 are provided at the points of contact of the parts 3a and 4a.

From the foregoing description, it will be appreciated that the invention provides a mounting device, for the attachment of a sealing profile, fascia board or the like at the junction between the upright structure and the roof of a building or at the eaves or gable, or at the junction between the roof bearers and ceiling bearers, which achieves a very firm anchor while at the same time providing for very simple vertical adjustability of the part carrying the sealing profile or fascia board. Interengagement of the mounting device's parts is achieved by simple clamping and without the need for screw connections therebetween, whereby installation is considerably simplified and rendered less expensive than hitherto.

The practical applications of the mounting device of the invention as above discussed have been given by way of example. It is, of course, possible to use the mounting device for the attachment of other sealing members, boards or the like in buildings and other structures. Thus, the device can be used for mounting cappings, copings, facings, facade facings or the like.

I claim:

1. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with the toothings in engagement, the improvement comprising a clamping band embracing the two holding parts, one of the holding parts having a recess, and a key having a portion inserted in such recess and a portion inserted between said band and one of the holding parts embraced thereby.

2. The mounting device defined in claim 1, in which a space between teeth of toothing on one of the holding parts forms the recess engaged by the key.

3. The mounting device defined in claim 2, in which the toothing forming the recess is formed on the inner face of the vertical leg and the key has toothing complementally engageable with said toothing on the inner surface of the vertical leg.

4. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising a band embracing the two holding parts and a wire, profile pin, or the like insertable laterally between the toothings of the holding parts for locating the clamping band lengthwise of the holding parts.

5. The mounting device defined in claim 4, in which the toothing side of one of the holding parts has a recess for receiving the wire, profile pin, or the like engaged between the two holding parts.

6. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising two channel-shaped stirrups embracing opposite edge portions respectively of the two holding parts disposed with their toothings in engagement, and a spring connecting said stirrups and holding them in such embracing relationship to the two holding parts.

7. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising a channel-shaped band embracing the two holding parts and having ends which can be bent over into clamping engagement against one of the holding parts, and such holding part and said bent band ends having interengageable projections and recesses.

8. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising a U-shaped clamping band which can be pushed onto the two holding parts from the side into a position embracing such parts and the flange edges of which band has barbs engageable with the respective holding parts, and a tongue located between the flanges of the channel, insertable between the holding parts and having teeth engageable with toothing on one of such holding parts.

9. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising forming the holding parts with longitudinal slots extending therethrough in registry and a T-shaped key insertable through such slots and having projections engaging the margins of the slots to hold the two holding parts together.

10. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising a clamping strip integral with an edge of one holding part and embracing the lateral edge of the other holding part, and interengaging means engaged between said clamping strip and such other holding part for retaining said clamping strip in such embracing position.

11. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising the toothing of one holding part having teeth more widely spaced than the teeth in the toothing of the other holding part, but such wider spacing being a multiple of the spacing of the teeth in the toothing of such other holding part and means engaged between the two holding parts for holding teeth of the two toothings in engagement.

12. In a mounting device for attaching facing members such as sealing strips, fascia boards and the like in building facings, including a first holding part adapted for attachment to the structure of the building and having a vertical leg formed with toothing on its outer face and a second holding part which is adjustably arranged on the vertical leg and which has respective toothing on its face confronting the first holding part and holds a facing member, the two holding parts being adapted to be clamped together with their toothings in engagement, the improvement comprising the first holding part being of generally T-shape with the stem adapted for attachment to the structure of the building and the vertical leg including projections extending beyond opposite sides of the stem, one of said projections being longer than the other of said projections.

References Cited

UNITED STATES PATENTS

| 1,368,191 | 2/1921 | Nelson | 287—58 |
| 3,365,847 | 1/1968 | Josek | 52—94 |
| 3,381,425 | 5/1968 | Gobel | 52—96 |

ROY D. FRAZIER, Primary Examiner

J. F. FOSS, Assistant Examiner

U.S. Cl. X.R.

52—96